June 15, 1971  R. C. UHLIG ET AL  3,585,048
PLASTIC FOOD PACKAGE ADAPTED TO BE HEATED
Filed April 1, 1969
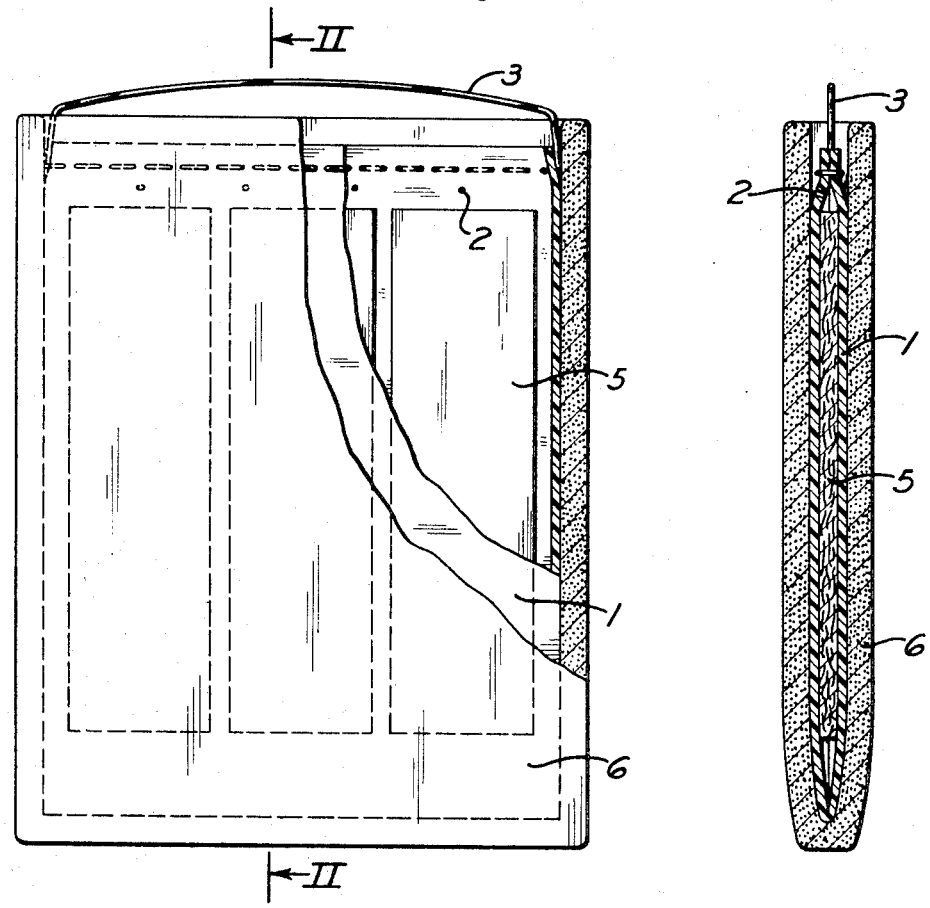
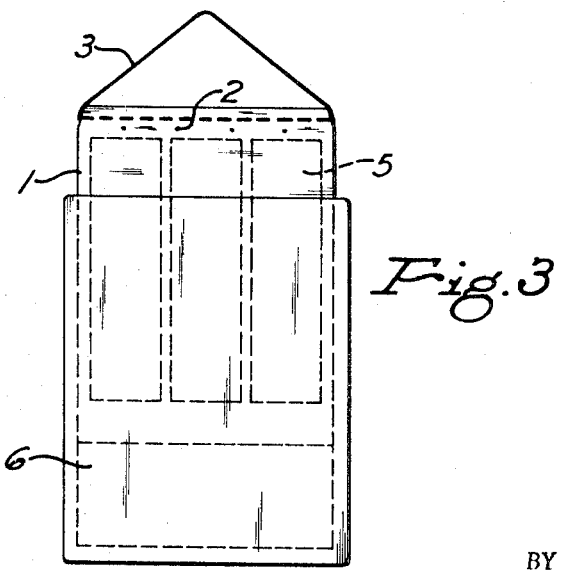
INVENTORS.
RAYMOND C. UHLIG
GLORIA E. UHLIG
BY
*Brown, Murray, Flick & Peckham*
ATTORNEYS.

3,585,048
PLASTIC FOOD PACKAGE ADAPTED TO BE HEATED

Raymond C. Uhlig and Gloria A. Uhlig, both of 2387 Oakview Drive, Pittsburgh, Pa. 15237
Filed Apr. 1, 1969, Ser. No. 811,717
Int. Cl. B65b 25/22
U.S. Cl. 99—174                           3 Claims

ABSTRACT OF THE DISCLOSURE

Precooked food is enclosed in a flexible envelope having an end adapted to be opened. The envelope is contained in a self-sustaining sheath of partially baked dough that is open at the same end as the openable end of the envelope. The dough sheath protects the envelope when the package is placed in an electric toaster to complete the baking of the dough and to heat the food in the envelope.

---

There now is a variety of partially or completely precooked foods that can be placed in electric toasters to heat them for eating. Among these is precooked food sealed in an envelope to shield it from moisture. One commercial item is a metal foil envelope containing precooked strips of bacon. To prevent the foil from causing a short circuit or a shock in an electric toaster, the foil is coated with dielectric material. Nevertheless, there always is danger that the coating may be scraped off a portion of the foil, or the package may be torn and an edge of the foil exposed. It also has been proposed to enclose the food in a plastic envelope that will withstand the heat of a toaster without shrinking, curling, melting or burning. If such plastics are available at all, they are expensive and have to be made too thick. Of course, if the food is solid enough and completely fills the envelope, the food itself may prevent shrinkage and curing of the envelope to some extent, but it is unlikely that food having this volume could be completely heated through in a normal electric toaster cycle.

It is among the objects of this invention to provide a food package of the type just mentioned, which cannot cause electrical shock or a short circuit, which seals precooked food from outside moisture, which can be sold at a reasonable price, and which includes more than one edible food.

The preferred embodiment of the invention is illustrated in the accompanying drawings, in which FIG. 1 is a side view of the food package, with parts broken away.

FIG. 2 is a vertical section; and

FIG. 3 is a reduced side view of the heated food package, with the envelope partially removed.

Referring to FIGS. 1 and 2 of the drawings, a rectangular envelope 1 is formed of thin flexible material that is impervious to moisture. Preferably, the material is a synthetic plastic. It must be thick enough to be impervious, but otherwise as thin as possible in order to hold down the cost. The material also must not be affected by a temperature at least as high as the boiling point of water. There are a number of inexpensive plastics that fulfill these requirements. The envelope is tightly sealed or substantially sealed, by which is meant that one end may in some cases be provided with tiny vent holes 2, such as pinholes. These holes may be closed normally by one side of the envelope. The end containing the vents is formed for easy opening. One convenient way of doing this is to seal a tear string 3 in the end of the envelope, leaving an end of it or a loop exposed. The exposed portion can also be used as a handle, as will be explained presently.

Before the envelope is sealed, precooked food is placed in it. This can be any suitable food that can be kept in good condition, even if freezing is necessary. It can be meat, eggs, omelet, etc. For the purpose of this description strips of bacon 5 will be considered. Several strips are sealed in the envelope after being cooked. The envelope will keep the bacon from absorbing moisture from the atmosphere and becoming soggy, especially during the heating cycle.

If the enveloped bacon is latter placed in an electric toaster to heat it, the heat of the toaster, which may be around 500° F. would cause a thin plastic envelope to shrink and curl and greatly distort the bacon strips. The envelope might cling around the strips, thereby making their removal difficult, or it might even melt or burn. These things are true of the well-known polyester films, including Mylar, and of cellophane.

It is therefore a feature of this invention that provision is made for protecting the envelope from the intense heat of the toaster. This is accomplished by enclosing the envelope in a sheath of dough. The dough is partially baked in the form of a rectangular sheath 6 to make it self-sustaining and to form a pocket in which the envelope can be inserted. One end of the sheath is open for receiving or removal of the envelope. The sheath also can be formed by first forming uncooked dough around the envelope and then prebaking it. The dough can be made according to various recipes, and preferably is one that will form a tasty food when toasted. It should contain enough moisture after prebaking to produce steam when later heated to a high temperature. The dough sheath encloses the envelope, except that the end that can be opened may project slightly from the open end of the sheath unless it has the tear string, in which case only the string needs to extend out of the sheath. The thickness and size of the entire food package are such that it can easily be inserted in the usual electric toaster.

When bacon is the precooked food, the package may be frozen immediately after it has been formed. In order to prepare the bacon for consumption, the package can be dropped into the toaster while still frozen, or it can be thawed first. As the package becomes heated, the moisture in the dough turns to steam and some of it rises between the sheath and the envelope. The dough sheath and the steam protect the envelope from the intense heat of the toaster by limiting the temperature of the envelope to about the boiling point of water, but the steam heats the bacon to make it hot and pallatable. As some foods may require more time than others to be heated up to the desired temperature, the amount of moisture in the sheath can vary with the food. However, there is no problem in determining for each different food a sheath moisture content that will accomplish the desired purpose of protecting the envelope from overheating while it is in the toaster. If the bacon strips have not been packed in the envelope under vacuum, there may be some danger of the expanding heated air in the envelope rupturing the package. This can be avoided when the envelope is provided with one or more of the pinholes 2 to allow the air to escape.

By the time the food package has been heated for the length of a toaster cycle normally used or slightly longer than for toasting bread, the dough sheath will be toasted and the bacon will be hot enough to eat. The package then is lifted from the toaster, aided by the projecting tear string if desired. The string also can be used to pull the envelope out of the toasted sheath, as shown in FIG. 3. Then the envelope is torn open by the string and the hot crisp bacon removed. The sheath can be buttered and eaten as toast. Consequently, a breakfast or lunch of toast and bacon is quickly and easily provided by means of a single package.

The envelope, being made of a dielectric material, can cause no electrical accidents, and yet the envelope is not harmed by the toaster heat. The envelope protects the food inside of it from the moisture in the dough and from the steam. Of course, an electric toaster is not necessary for heating the package, as it likewise can be heated in an oven.

We claim:

1. A food package comprising a substantially sealed flexible plastic envelope, precooked food inside the envelope, and a self-sustaining sheath of partially baked moisture-containing dough containing the envelope, said sheath protecting the envelope when the package is placed in an electric toaster to complete the baking of said dough and to heat the food in the envelope, and the moisture content of the sheath being such that the vapor it produces during the heating of the package limits the temperature of the envelope to about the boiling point of water, said envelope protecting the food therein from the moisture in the sheath and from said vapor.

2. A food package according to claim 1, in which said sheath is open at one end for removal of said envelope.

3. A food package comprising a substantially sealed flexible plastic envelope, precooked food inside the envelope, and a self-sustaining sheath containing the envelope and provided with an opening for removal of the envelope, the sheath being moist enough to produce sufficient steam around the envelope when the package is placed in an electric toaster to limit the temperature of the envelope to about the boiling point of water, whereby the steam will protect the envelope and heat the food inside it.

References Cited

UNITED STATES PATENTS

| | | | |
|---|---|---|---|
| 2,912,336 | 11/1959 | Perino | 99—171X |
| 3,062,664 | 11/1962 | Pollock | 99—171 |
| 3,185,372 | 5/1965 | Ferraro | 99—171X |
| 3,322,319 | 5/1967 | Sweeney et al. | 99—171 |
| 3,392,033 | 7/1968 | Thulin | 99—171 |
| 3,469,999 | 9/1969 | Meyers | 99—172X |

FRANK W. LUTTER, Primary Examiner

S. L. WEINSTEIN, Assistant Examiner

U.S. Cl. X.R.

99—171H